June 17, 1969  W. M. DAVIS  3,450,526
PROCESS FOR CONTINUOUS LIQUID-SOLID CONTACTING
Original Filed July 22, 1965  Sheet 2 of 2

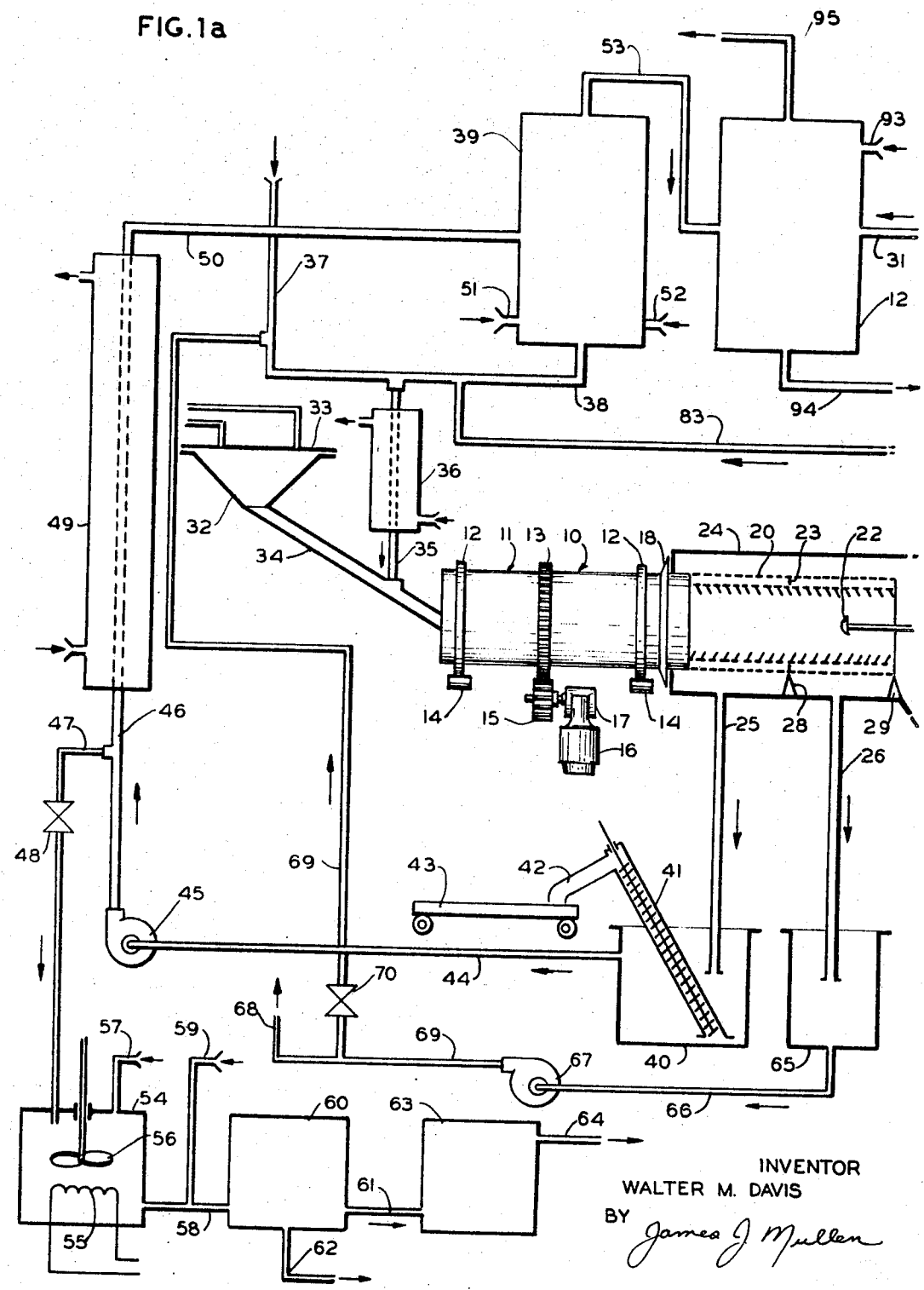

INVENTOR
WALTER M. DAVIS
BY James J. Mullen
ATTORNEY

United States Patent Office 3,450,526
Patented June 17, 1969

3,450,526
PROCESS FOR CONTINUOUS LIQUID-SOLID CONTACTING
Walter M. Davis, St. Louis, Mo., assignor to Monsanto Company, St. Louis, Mo., a corporation of Delaware
Original application July 22, 1965, Ser. No. 474,072, now Patent No. 3,400,871, dated Sept. 10, 1968. Divided and this application July 7, 1967, Ser. No. 663,908
Int. Cl. C22b 15/10, 23/04
U.S. Cl. 75—103                              3 Claims

ABSTRACT OF THE DISCLOSURE

The present invention relates to an apparatus and a continuous process for extracting solubles from solids. The process specifically covers the concurrent contacting in a reaction vessel of a metal value-containing material such as scrap copper, an oxygen-containing gas such as air, and a solvent such as an ammonium carbonate solution which is at a temperature of 90 to 130° F. for a sufficient period of time, such as 1 to 10 hours, to extract the copper into said solvent. In a first stage, a substantial part of the solvent liquid which contains, for example, the copper is separated from the insoluble solid material while both are in said vessel. In a second stage, said solid material is washed, such washings being separated from the solid material also while both are in the vessel. In a third stage, the solid material is discharged from the vessel. Part of the liquid and washings from the first and second stages, respectively, are recycled to the charge end of the vessel where they are mixed with fresh solvent.

---

Figure 2:
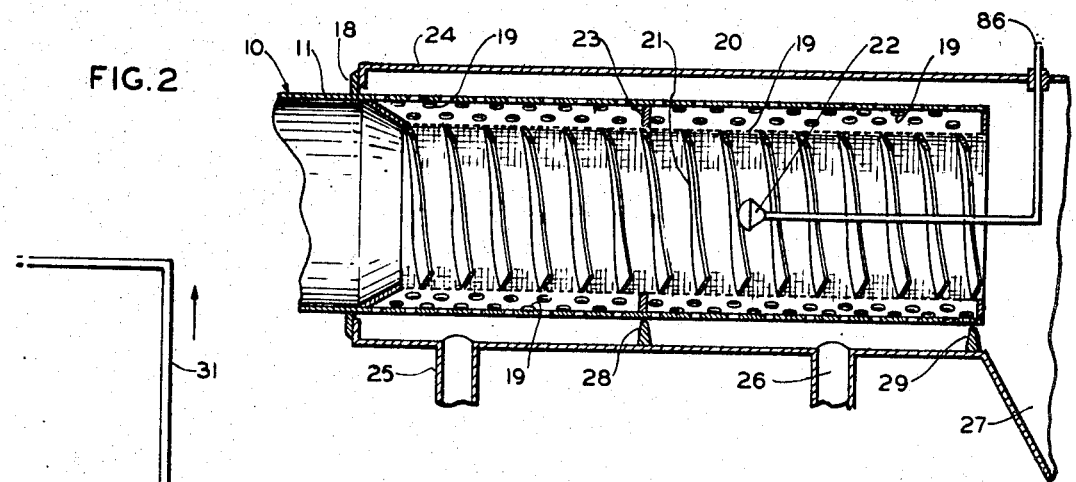

This application is a division of application Serial No. 474,072, filed July 22, 1965, now U.S. Patent No. 3,400,871.

This invention relates to a process for extracting solubles from solids, of which the principal object is to provide a substantially continuous dissolving procedure whereby products of relatively high degrees of purity are automatically extracted from a solid by a solvent both of which are moving cocurrently. More particularly this invention relates to a method of extracting metal values from starting materials such as ore, concentrates, and metallurgical intermediates and residues, and is particularly directed to providing a method for leaching such starting materials for the extraction therefrom of metal values such as nickel, copper, cobalt, etc. Even more specifically, the present invention is concerned with the continuous leaching of copper from copper-bearing scrap materials by the use of a solvent such as an ammonia-ammonium carbonate solution.

Over the past fifty years, with the increasing utilization of such nonferrous metals as copper, zinc, nickel, cobalt, cadmium, and the like, particularly copper, there has steadily grown a demand for an improved procedure whereby such metals can be more efficiently recovered from various materials as, for example, scrap, ores, etc. Particularly throughout the latter part of this period, many attempts have been made to provide processes and apparatuses for carrying out purely chemical or hydrometallurgical operations. Some of these chemical processes, among which are operations generally known in the art as hydrometallurgical production or processes, are described in the following U.S. Patents: 805,017, 2,647,825, 2,647,830, 2,734,821, 2,740,707, 2,767,081, 2,767,082, 2,814,564, 2,830,895, 2,853,380 and 3,127,264. The patents are merely exemplary and are not limitive or exhaustive and are set forth herein merely to show the wide variety of hydrometallurgical processes and/or apparatuses for producing metallic particles.

In conjunction with the aforementioned patents, specifically with reference to the leaching step disclosed therein, it is to be noted that the leaching step is conducted on a batchwise basis. If, for example, the leaching step is being conducted wherein copper material or copper compounds are being extracted from copper-bearing scrap materials, the following process may be used. The copper-bearing scrap material may be pretreated in a variety of ways in order to remove the impure materials from the nonferrous metals. An example of such pretreatment is the burning of insulating materials from old copper wiring. The pretreated copper may then be placed in a large holding or leaching tank containing a leaching liquid which is generally an ammoniacal-ammonium carbonate solution. However, other ammonium salts may be utilized. The leaching solution is then agitated by various means in order to provide a liquid-solid contact between the scrap material and the solution or solvent, which terms are used interchangeably hereinafter. During this leaching step, air is fed into the leaching solution which is at a temperature of from about 90° F. to about 130° F. in order to maintain the ratio of cuprous to cupric ions in the solution within the range of from about 2:1 to about 4:1 which factor consequently aids in the precipitation of copper particles from the solvent.

During this leaching operation, the copper from the scrap material is extracted and dissolved in the leaching solution which is then referred to in the art as the "pregnant" solution or strong liquor. The next step entails the separation of the copper-bearing solution or "pregnant" solution from the residue or insoluble solid material remaining in the tank. The copper-bearing solution is usually drained or decanted from the tank and the residue material is then removed therefrom by means of an overhead crane or by mechanical or manual digging of the material from said tank. It has been found from past experience that the residue recovered from the leaching tank contains a substantial amount of copper material which either is never recovered or cannot be recovered economically.

The copper-bearing solution may then be transferred to another tank wherein a reduction step is carried out which brings about the precipitation of discrete copper particles which are then separated by various means, i.e. filtration, centrifuging, decantation, etc. The freshly precipitated copper particles may then be either used in the wet state or they can be dried to a powdered product containing less than 1 to 2% by weight moisture prior to any additional treatment. The wet copper particles or the dry copper powder thereafter usually undergoes further processing steps, specifically, sintering whereby the copper powder is reduced to substantially pure metallic copper of various shapes.

With reference to the aforementioned leaching process and equipment, it is to be noted and it has been found from practical experience that the batchwise process and its associated equipment relating to the leaching, for example, of the copper metal values from the copper-bearing scrap materials with an ammoniacal-ammonium carbonate solution, is inefficient, burdensome and very time consuming. In view of the inefficiency of the batchwise leaching process, the provision of an apparatus and method for the continuous leaching of nonferrous metal values from materials containing the same has been long overdue in the metallurgical art and the prior art has not recognized the seriousness or criticality of the leaching operation from an economic point of view.

Accordingly, it is one object of the present invention to provide an improved process for continuously bringing into intimate contact solid material with liquid or liquids.

It is another object of this invention to provide an improved process for continuously extracting a soluble component from solid material in which the liquid solvent and the solid to be extracted move cocurrently through the system.

It is a further object of the present invention to provide a metallurgical leaching process which continuously and efficiently leaches recoverable copper values from copper-bearing scrap materials by the use of an ammoniacal-ammonium carbonate solution.

It is another object of the present invention to provide a continuous process for the leaching of ores, concentrates, and/or scrap materials in order to efficiently recover nonferrous metal values therefrom.

Further objects and advantages of this invention will become apparent from a consideration of the detailed description of the invention as given below when considered together with the appended claims.

Briefly, the present invention provides, in part, a solid-liquid contacting or leaching apparatus wherein one of the critical components thereof is an elongated rotatable cylindrical vessel provided at one end thereof with a unique discharge means which is composed essentially of a longitudinal section of said vessel's outer wall which contains perforations therein and which also contains a longitudinally disposed mesh screen therein and spaced inwardly from said outer wall of the vessel. The cylindrical vessel is usually mounted so that the longitudinal axis thereof is substantially horizontal. However, it can be tilted to some degree from the horizontal, i.e., the discharge end may be slightly lower than the charge end, if the leaching rates or dissolution rates are sufficiently fast. The vessel is also providde with means to cause it to rotate about its longitudinal axis. The discharge end is enclosed within a stationary housing which is provided with three discharge conduits located in the bottom portion thereof. Leachable material is charged to the cylindrical vessel by suitable feeding means, for example, a hopper and the material being discharged from the discharge end of said vessel falls through the three discharge conduits into receivers positioned beneath the cylindrical vessel and/or housing. The housing constitutes another critical feature of the present invention; and, in addition to the discharge conduits located in the bottom portion thereof, there are baffles which are also positioned in the bottom portion of said housing and which are located immediately below the discharge portion of the rotary cylinder. The combination of the discharge end of the cylindrical vessel plus the housing then consequently effects the unique 3-way separation and provides an efficient means for separating soluble material (which is dissolved in a liquid) from an insoluble material. The receivers located beneath the cylindrical vessel and/or housing are also provided with a recirculation system whereby the material contained therein is recirculated through by various means to the starting or charge end of said cylindrical vessel. A treating and storage system is also connected to one of the recirculating transfer lines in said system and the material desired as an end product is diverted from the stream which is being recirculated to the charge end of said rotating vessel.

*Apparatus description*

Figure 1B:
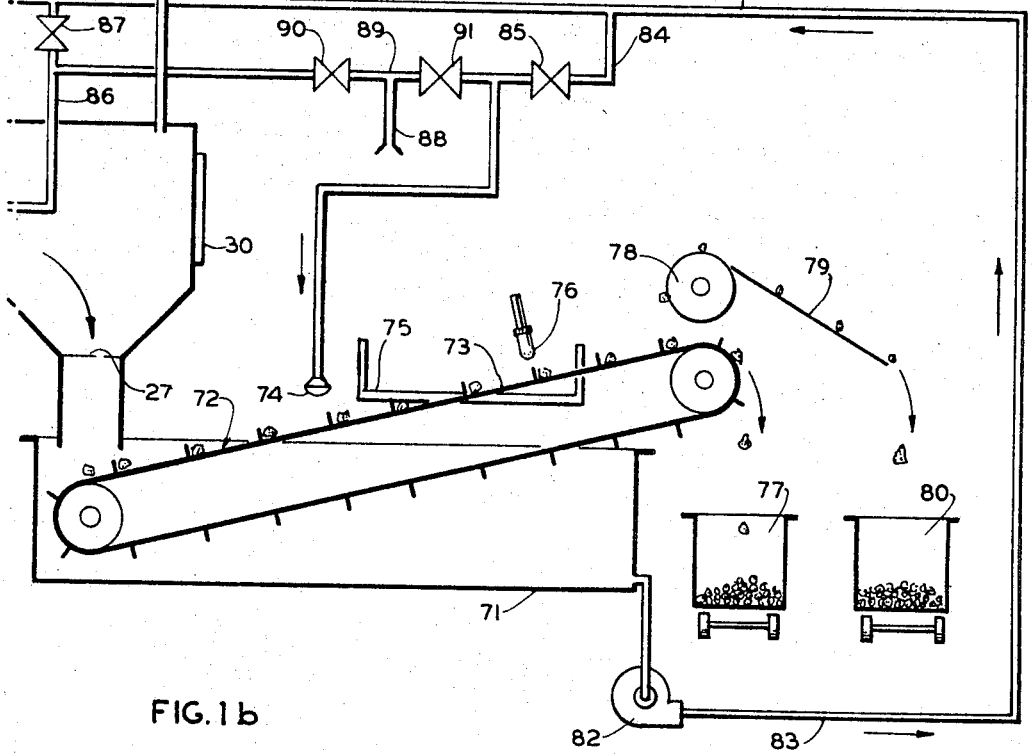

In the accompanying drawings, forming a part of this specification, and which like numerals are employed to designate like parts throughout the same:

FIGURES 1a and 1b are a side elevation, partly in section, of a complete leaching apparatus, including a cylindrical leaching vessel, the liquid or solvent recovery and recycle system, and the strong liquid handling system, and FIGURE 2 is a sectional view of a rotary leaching device, specifically the discharge end thereof, taken along a plane vertical to the longitudinal axis of the aforesaid leaching vessel.

Referring to FIGURES 1a, 1b and 2 in the drawings, wherein for the purpose of illustration, is shown a preferred embodiment of the invention, the numeral 10 generally designates a rotary leacher which is characterized further as an elongated, cylindrical, substantially horizontally disposed vessel having an outer shell or wall 11. Attached to the outer periphery of wall 11 are a pair of bearing rails 12 and a gear ring 13. The vessel is mounted on and rotatably supported by means of bearings 14 cooperating with the bearing rails 12. The vessel is rotated by means of an electric motor 16 which is positively connected with a gear control 17 having a gear wheel 15 which meshes with the gear ring 13. It is to be noted that the bearing rails 12 and the gear rings 13 completely extending about the outer periphery of wall 11 of said vessel 10.

Near the discharge end of vessel 10 which is enclosed in a housing 24 hereinafter described is a rotary seal 18 which provides an airtight connection between said vessel 10 and the housing.

As is shown in FIGURES 1a, 1b and 2, the discharge end of vessel 10, which constitutes one of the important parts or critical features of the present invention is enclosed within stationary housing 24 which is hereinafter more particularly described. The discharge end is shown in greater detail in FIGURE 2 and comprises the outer shell or wall 11 which is provided with numerous perforations 19 which are sufficient in number and extend for an effective distance along the discharge end of vessel 10 to permit the liquid or solvent in the vessel to drain from the vessel. Disposed within said perforated wall area and spaced inwardly from the outer wall and toward the longitudinal axis of the vessel is an annular mesh screen 20 mounted substantially parallel to such outer wall. Preferably the screen has one-quarter inch openings but other mesh opening sizes can be utilized; however, it is preferred that the screen openings be smaller than the size of the wall perforations. Attached to the interior of mesh screen 20 is a single helix 21 which extends the full longitudinal length of said screen. Also located in the interior portion or open space of said screen but spaced therefrom, and not attached thereto, are spray nozzles 22. Attached to and positioned between the exterior portion of the mesh screen and the interior portion of the perforated wall is an annular baffle 23 which extends in a circumferential manner and is positioned in a plane vertical to the longitudinal axis of the vessel 10. While said mesh screen is shown as being annular, it is also within the scope of the present invention to have various geometric designs, e.g., rectangular, triangular, polygonal, etc., for said screen. Furthermore and in view of this latter screen change design, the means for moving the solid material in the discharge end of said vessel may take the form of single flights individually attached along the longitudinal interior of said screen, or any anfractuous design.

Another important feature of the present invention is the stationary housing 24 which (as noted previously) encloses the discharge end of rotary vessel 10. As shown in FIGURES 1a, 1b and with more detail in FIGURE 2, stationary housing 24 is provided with discharge conduits 25, 26 and 27 which are located in the bottom portion thereof. Positioned between discharge conduits 25 and 26 is a baffle 28 which is also located substantially below baffle 23 and substantially in the same vertical plane thereof. Baffle 28 serves to divert liquor flowing from the perforations 19 (closest to the charge end of vessel 10) into discharge conduit 25. Located between discharge conduits 26 and 27 is baffle 29 which is positioned substantially below the outermost end of the discharge portion of the rotary vessel and thus serves to divert most of the remainder of the liquor draining from perforations 19 into conduit 26. As can readily be seen, both baffles 28 and 29 are located in the bottom portion of housing 24. Said housing is also provided with a closure or door 30 which is located in the portion of the housing which is opposite the discharge end of the said vessel through which operation of the discharge end of the leacher may be observed. Positioned in the top portion of said housing is an exhaust duct 31.

Referring now more particularly to the charge end of rotary vessel 10, it will be noted that the material to be leached in the vessel is fed into the vessel by suitable means such as a hopper 32, which is provided with a cover 33, and the bottom portion of which has connected thereto a conduit 34 which empties into the charge end of the vessel 10. Additional material, preferably leach liquor, may be fed to rotary leacher 10 through conduit 34 by means of connecting conduit 35 which is in turn connected to heat transfer means 36, said conduit 35 being the discharge line therefrom and conduit 37 being the charge line thereto. Discharge conduit 38 also provides additional material to conduit 37 from oxidizer 39 which is hereafter described in more detail.

Referring now more particularly to the discharge portion of the overall system, specifically the stationary housing 24, the first discharge conduit 25 is provided with a receiver 40 which is positioned immediately beneath said conduit, said conduit extending into receiver 40. Positioned within receiver 40 is an inclined screw conveyer 41 which is provided near the uppermost portion thereof with a wash line 42 and which empties into a portable receiver 43. Located near the top or uppermost portion of receiver 40 is a discharge line or conduit 44 which is connected to the feed end of pump 45. The liquid material being discharged from pump 45 flows through line 46 which has a connecting line or off-take conduit 47 whereby any desired amount may be diverted from line 46. The amount of liquid being conveyed through said conduit 47 is controlled by means of valve 48 and is thereafter carried to a storage container hereinafter described. The liquid material being conveyed or recirculated through line 46 passes through a heat exchange means 49 and is subsequently discharged therefrom into conduit 50 which empties into oxidizer 39 (previously referred to) wherein it is mixed with additional materials, air and liquid, being conveyed to said oxidizer through lines 51 and 52, respectively. It should be noted that conduit or line 50 terminates in said oxidizer at a point above the inlet area of conduits 51 and 52. Said oxidizer is also provided with an exhaust duct or conduit 53 which conveys any gaseous material therein to a scrubber 92 which is hereinafter described.

As pointed out heretofore, the liquid materials being discharged from pump 45 and being conveyed through conduit 46 may be diverted through line 47, the amounts so diverted being controlled by means of a valve 48, into a storage container 54 wherein the liquid material contained therein undergoes a heat treatment and agitation by means of heat exchange coil 55 and mechanical agitator 56, respectively. Additional liquid material may be added to said storage container by means of conduit 57 which is positioned in the uppermost portion thereof. Filter 60 is connected to said storage container 54 by means of conduit or transfer line 58, said filter also being precoated, if necessary, by a filter aid material being injected therein via conduits 59 and 58. A purified liquor storage container 63 is connected to filter 60 by means of conduit 61 whereby the material being filtered may be stored therein for further treatment and conveyed therefrom through conduit 64 to a reduction autoclave (not shown). Filter 60 contains a discharge waste conduit 62 located in the bottom portion thereof in order to remove waste material collected on the filter elements.

Referring now to the second discharge conduit 26, leading from housing 24, this conduit discharges by gravity into receiver 65 positioned beneath housing 24. The liquid material collected in such receiver is discharged through conduit 66 and pumped to a weak liquor storage container, which is not shown, by means of pump 67 and through conduit 68. However, there is provided a recirculation system whereby material in conduit 68 may be partially diverted and recirculated to the charge end of said rotary vessel by means of conduit 69 which contains and has positioned therein valve 70 controlling the material flowing therethrough, the conduit 69 may be connected to line 37 which previously has been described.

With reference to the third discharge conduit 27, in the lower part of housing 24, this discharges primarily solid residue and some occluded liquor exiting from vessel 10 into receiver 71 positioned beneath said conduit and below the uppermost portion thereof. Partially positioned within receiver 71 is an inclined endless belt conveyor 72 having flights 73 positioned on the exterior surface of the belt. Said conveyor is positioned in receiver 71 so that the lowermost end thereof is disposed immediately beneath the discharge end of conduit 27 and is adapted to convey the aforementioned solid residue. Adjacent to receiver 71 and positioned immediately above endless conveyor 72 are spray nozzles 74, pickers 75, burner 76, and a rotating magnetic separator 78 which is positioned directly above the uppermost of said endless conveyer which in turn is located outside of such receiver 71. Located immediately below the uppermost end of such endless conveyer is a portable receiver 77 for the collection of solid materials being discharged from said conveyer. Disposed immediately adjacent to the magnetic separator 78 is an inclined belt or chute 79 whose lowermost end is positioned above a portable receiver 80 which collects materials which are picked up by said rotating magnetic separator and discharged onto said chute 79 into receiver 80.

The liquid material collected in receiver 71 can, if desired, be recirculated to the charge end of rotary vessel 10. Thus, this liquid material may be discharged through conduit 81 which is located in the bottom portion of receiver 71 by means of pump 82. Such pump then forces the liquid material through conduit 83 which subsequently terminates in and is connected to line 37 heretofore described. The material recirculated in this manner can be partially diverted from conduit 83 into the conduits 84 and 86 which are provided with valves 85 and 87, respectively, such valves controlling the amount of material being diverted from conduit 83. Conduit 84 is connected to spray nozzle 74 and conduit 86 is connected to spray nobble 22 (which, as previously noted, sprays liquid into the discharge end of vessel 10). If desired, additional liquid may be introduced into conduits 84 and 86 by means of conduits 88 and 89, which conduit 89 is provided with valves 90 and 91 which control the amount of material flowing therethrough.

As previously mentioned, housing 24 is provided with an exhaust duct or conduit 31 which terminates at scrubber 92 which also receives gaseous material from oxidizer 39 through conduit 53. Scrubber 92 functions as a means to collect any valuable gas being discharged from said housing and oxidizer and which is recoverable by means of a countercurrent contact flow between the gas and a solvent such as water being injected through line 93. Located in the bottom portion of said scrubber is a discharge line 94 which conveys the gas-containing solvent to a recovery unit such as an ammonia still or other apparatus (not shown) to purify and/or recover the gas. Located in the uppermost portion of scrubber 92 is an exhaust conduit 95 which is connected to a blower stack which is not shown in FIGURES 1a, 1b or 2. The blower creates a vacuum in scrubber 92.

As pointed out heretofore, the novel apparatus and process of the present invention is generally directed to a liquid-solid contact system and is more particularly directed to the processing of copper-bearing scrap material, ores, concentrates, etc. However, it is to be noted that it is within the scope of the present invention to process other nonferrous metals in said apparatus, such as nickel, cobalt, cadmium, etc.

*Process description*

The novel process, which comprises the other part of the present invention, possess a number of important advantages. The capital and operating costs are low as compared with the capital and operating cost of conventional batchwise hydrometallurgical leaching processes. Furthermore, the nickel, cobalt, copper, and other metal values are recovered in a condition which permits use of an inexpensive treatment for the production of metal substantially free of impurities. Also only a relatively small amount of metal values are lost in the process and by-products. The novel process is extremely efficient, as for example, by the recovery of ammonia gas from the housing 24 by the scrubber 92, the subsequent still distillation of the water containing said ammonia, and the recirculation of the liquid in receiver 71 which is subsequently used along with the strong liquor to leach the newly injected scrap material. In addition, almost complete recovery of the metal values supplied to vessel 10 is achieved.

The novel process which comprises part of the present invention is hereinafter described.

As pointed out heretofore, the novel process and apparatus of the present invention are directed to some extent to the processing of nonferrous containing scrap materials, ores, concentrates, etc. and more particularly directed to the leaching of copper from copper-bearing scrap material. However, the novel apparatus and process may be utilized in a majority of solid-liquid operations.

In one preferred embodiment of the present invention, the continuous solid-liquid contacting process comprises the steps of (a) feeding a metal value-containing material, i.e., solid materials and/or liquid materials having solid particles therein, said material also containing solids which are not soluble in the solvent (extractant) liquid, an oxygen-containing gas, and a solvent (extractant) liquid which is used for the extraction and/or dissolution of all or certain specific metal values in said material, into the charge end of a rotating vessel; (b) co-currently contacting such aforementioned materials while advancing such materials to the discharge end for a period of time sufficient to extract the desired metal values into such extractant liquid; (c) separating, in a first stage, a substantial part of the solvent liquid which contains the dissolved solid (metal values) material from the insoluble solid residue material while both are in said vessel; (d) washing such insoluble solid residue material with a liquid to essentially replace the extractant liquid, in a second stage, and separating the washing liquid from the residue while both are in said vessel; (e) discharging the insoluble solid residue material, in a third stage, from the discharge end of such rotating vessel which is opposite the charge end thereof; and (f) recycling at least a part of such solvent liquid which contains the dissolved metal values to the charge end of said vessel.

Using the leaching of copper from copper-bearing scrap material as an example, the more specific parts of the novel process of the instant invention are set forth below.

Solid material, such as copper-bearing scrap material, air and a solvent liquid such as an ammonium carbonate solution, are fed into elongated vessel 10 which is rotated by means of members 12–17 at from about 1 to about 5 revolutions per minute, the longitudinal axis of said vessel being situated in a plane parallel to the horizon.

One of the critical features in the novel process of the present invention is the contact time between the solvent liquid and solid (or liquid) materials, containing the metal values, being cocurrently conveyed through the vessel, such as rotary leacher 10. In order to achieve optimum efficiency in the overall system, the copper must be substantially completely removed from the copper-bearing scrap material prior to the separation in the first stage of the insoluble solid residue material from the solvent liquid which contains the dissolved copper metal values. In order to achieve this end result, it may be necessary for the contact time between the solid material and solvent liquid to be within the range of from about 1 to about 10 hours or more utilizing a rotary leaching vessel, such as rotary leacher 10 heretofore described having a length of from about 40 to about 100 feet and an inside diameter of from about 8 to about 10 feet. However, if the dissolution rates are relatively slow, it is within the scope of the present invention to have a contact time of from about 1 to about 24 hours utilizing a vessel having a length of up to 600 feet.

When the copper has been substantially completely extracted and/or leached from the copper-bearing scrap material in said vessel 10 and as it approaches the discharge end thereof, the solvent liquid which contains the dissolved copper metal values is separated in a first stage by means of mesh screen 20 which permits the passage therethrough of the liquid but retains the insoluble residue material; and the liquid is discharged from the vessel 10 through perforations 19, conduit 25 and into receiver 40 to be further processed or partially recycled to the charge end of said vessel 10. As the insoluble residue material moves along while in the discharge end of said vessel 10 and after the solvent liquid has been substantially removed from the vessel as heretofore set forth, the insoluble solid residue material is washed in a second stage while retained on screen 20 by means of water or weak solution liquor sprayed through nozzles 22 in order to remove and recover additional solvent liquid contained thereon or therein.

The washings from the washed insoluble solid residue material are also separately discharged, while in said second stage, from the discharge end of the rotating vessel by passage through mesh screen 20, perforations 19, conduit 26 and into receiver 65 prior to the discharge of the insoluble solid residue material from the outer extremity discharge end of said vessel 10. The washings are collected in said receiver 65 and at least a part of said washings may be recycled by means of pump 67 and conduits 66, 68, 69, 37, 35 and 34 to the charge end of said vessel. The nonrecycled washings are sent to a weak liquor storage tank (not shown) from which the weak liquor can be supplied directly to the dicharge end of said vessel via conduits 37, 35 and 34.

In a third and final stage, the insoluble solid residue material on screen 20 is discharged or falls by gravity from the discharge end of said vessel 10 through conduit 27 into receiver 71 wherein there is contained a washing liquid which is usually and initially fresh water. The insoluble solid residue material is washed by conveying such material on an endless conveyor 72 in an upwardly inclined direction through the liquid in said receiver. Upon the emergence of said material from said receiver 71, additional washing of the residue material may be accomplished by means of fresh water and/or recycled liquid from receiver 71 using spray nozzles 74. As the insoluble solid residue material is being continuously removed from said receiver 71 and after being secondarily washed by said sprays 74, pickers 75 remove any large pieces of matter which it is desired to be kept separate from the rest of the solid residue material. Subsequently, the remaining material on the conveyor is dried by means of a gas flame from burner 43 whereby any organic material contained in and/or on said material may be burned therefrom. The resulting material is then subjected to separation means such as magnetic separator 78 whereby ferrous materials are removed therefrom and deposited in a separate receiver 80 as compared to the deposition of the remaining nonferrous-containing materials which fall by gravity into receiver 77, both receivers being portable or replaceable when a sufficient quantity of material has been collected therein.

The liquid in the receiver 71 is usually fresh water in the initial part of the operation and upon being contaminated with the solvent liquid, such as an ammonium carbonate solution, such liquid may be recycled to (a) the charge end of the rotating vessel 10, or (b) the spray heads 22 which wash the insoluble solid residue material prior to being discharged from such vessel, and/or (c) to the spray heads 74 which wash the residue material upon emergence from the receiver 71. If it is desired, fresh water make-up may also be injected into any one or more of the recirculated receivers 71 liquid streams by means of conduit 88.

The solvent liquid which is collected in receiver 40 and contains the dissolved copper or other desired metal value may be recycled to vessel 10 by means of pump 45 through a heat exchange means 49 wherein the liquid is usually cooled down from a higher temperature (because the leaching reaction is somewhat exothermic) to a temperature of from about 90 to about 130° F. It is also within the scope of the present invention to provide heat transfer means, e.g., steam jacket, gas burners, etc., for said vessel 10 in order to insure proper temperature control therein. Such recycled liquid preferably is also passed through an oxidizer 39 wherein the liquid is enriched with (1) an oxygen-containing gas, such as air, (2) ammonia, and (3) carbon dioxide. The cooled and enriched solvent (extractant) liquid in conduit 38 leading from the oxidizer then combines with weak liquor in conduit 37 which weak liquor may be part of the weak liquor collected in receiver 71 and/or weak liquor from the insoluble solid residue material washings, or weak liquor which has been freshly prepared. The two streams are then combined and passed through a heat exchange means 36 such as a steam heater wherein the combined stream is heated, if necessary, to a temperature of from about 90 to about 130° F., if the temperature of such stream is below such range. Thereafter the heated and mixed liquids are charged along with the copper-bearing scrap material and air into the charge end of said vessel 10 via conduits 34 and 35.

The nonrecycled solvent liquid from receiver 40 which contains a high concentration of dissolved copper metal values is conveyed to a liquid purification and storage area which consists of a storage container 54 wherein it is heated to a temperature of from about 90 to about 130° F. by heat transfer means 55 and agitated by impeller 56 during the addition of a precipitating agent (for precipitating the lead and tin values in the liquid) injected thereinto by means of conduit 79. Such agent subsequently effects the precipitation of other nonferrous metals such as lead and tin which are not desired in the final copper product. The liquid containing the precipitated material therein is then filtered through filter 60 and subsequently conveyed through conduit 61 to a purified liquor storage container 63. The use of a precipitating agent, such as for example, strontium sulfate, is well known in the art as exemplified by U.S. Patent 3,127,264. Prior to the filtration of said liquid, the filter elements are coated with a filter aid such as diatomaceous earth which has been prepared in solution form in a precoat pot (not shown), transferred by conduit 59 to and passed through said filter 60 prior to the filtration of said liquid. Periodically the filter is backwashed and the solid waste materials are removed therefrom through conduit 62.

It will be understood, of course, that modifications can be made in the preferred embodiments of the invention described and illustrated herein without departing from the scope of the invention as defined by the appended claims.

I claim:
1. A continuous liquid-solid contacting process comprising the steps of:
   (a) feeding a metal value-containing material, a oxygen-containing gas, and a solvent liquid which used for the extraction of certain specific metal value in said material, into the charge end of a rotatin vessel;
   (b) cocurrently contacting such aforementioned materials while advancing such materials to the discharge end of said vessel for a period of time sufficient to extract the desired metal value into such solvent liquid;
   (c) separating, in a first stage, a substantial part of the solvent liquid which contains the dissolved metal value material from the insoluble solid material while both are in said vessel;
   (d) washing such insoluble solid material with a liquid to essentially replace the solvent liquid, in a second stage, and separating the washing liquid from said solid material while both are in said vessel;
   (e) discharging said insoluble solid material, in a third stage, from the discharge end of such rotating vessel which is opposite the charge end thereof; and
   (f) recycling at least a part of the metal value-containing solvent liquid to the charge end of said vessel.

2. The process as set forth in claim 1 wherein the metal value-containing material being charged into said vessel contains a nonferrous metal selected from the group consisting of copper, nickel, and cobalt, the oxygen containing gas is air, and the solvent liquid is an ammonium carbonate solution which is at a temperature of from about 90 to 130° F.; and the further step of:
   (a) conveying the nonrecycled, metal value-containing solvent liquid to a treating tank wherein a precipitating agent is added thereto whereby other dissolved metal values than those desired to be in the final product are precipitated therefrom and the liquid containing the precipitates is thereafter filtered and stored.

3. The process as set forth in claim 2 wherein the recycled liquid containing the dissolved metal value material is cooled and enriched with an oxygen-containing gas and a solvent extractant liquid prior to being fed into the charge end of said vessel.

References Cited
UNITED STATES PATENTS

| 970,325 | 9/1910 | Goodwin | 75—101 |
|---|---|---|---|
| 1,014,868 | 1/1912 | Gadomsky | 75—103 |
| 1,115,523 | 11/1914 | Ellis | 75—117 |
| 1,163,828 | 12/1915 | Koering | 23—269 |
| 1,312,488 | 8/1919 | Leaver | 23—269 |
| 1,440,186 | 12/1922 | Sulman | 75—103 |
| 1,447,637 | 3/1923 | Baker | 23—269 |
| 2,733,990 | 2/1956 | Van Hare et al. | 75—117 |

L. DEWAYNE RUTLEDGE, *Primary Examiner.*
T. R. FRYE, *Assistant Examiner.*

U.S. Cl. X.R.
23—309, 312; 75—101, 117, 119